(12) United States Patent (10) Patent No.: US 7,108,371 B1
Ifergan (45) Date of Patent: Sep. 19, 2006

(54) EYEGLASSES WITH MAGNETIC MOUNTING INCLUDING A MAGNETIC FIELD BLOCKING MEMBER

(75) Inventor: Thierry Ifergan, Aventura, FL (US)

(73) Assignee: Aspex Eyeware, Inc., Pembroke Park, FL (US)

( * ) Notice: Subject to any disclaimer, the term of this patent is extended or adjusted under 35 U.S.C. 154(b) by 0 days.

(21) Appl. No.: 11/077,870

(22) Filed: Mar. 11, 2005

(51) Int. Cl.
*G02C 7/08* (2006.01)
(52) U.S. Cl. ......................................... 351/57; 351/47
(58) Field of Classification Search ................ 351/47, 351/48, 57, 58
See application file for complete search history.

(56) References Cited

U.S. PATENT DOCUMENTS

| | | | |
|---|---|---|---|
| 4,070,103 A | 1/1978 | Meeker | |
| 5,416,537 A | 5/1995 | Sadler | |
| 5,696,571 A | 12/1997 | Spencer et al. | |
| 6,343,858 B1 | 2/2002 | Zelman | |
| 6,375,321 B1 * | 4/2002 | Lee et al. | ...................... 351/47 |
| 6,550,913 B1 | 4/2003 | Zelman | |
| 6,705,722 B1 | 3/2004 | Zelman | |

\* cited by examiner

*Primary Examiner*—Huy Mai
(74) *Attorney, Agent, or Firm*—Greenberg Traurig, LLP

(57) ABSTRACT

An eyeglass device may include a primary spectacle frame and an auxiliary spectacle frame (each of which frames may support respective lenses). The primary spectacle frame may include two legs pivotally coupled to two side extensions. Further, the auxiliary spectacle frame may include two arms for engagement with the primary spectacle frame. In addition, each of the primary spectacle frame and the auxiliary spectacle frame may include one or more magnetically interacting materials (e.g., one or more magnets and/or one or more ferrous metals). The one or more magnetically interacting materials of the primary spectacle frame may be disposed in the vicinity of a bridge of the primary spectacle frame and/or in the vicinity of one or both of the side extensions. Likewise, the one or more magnetically interacting materials of the auxiliary spectacle frame may be disposed in the vicinity of a bridge of the auxiliary spectacle frame and/or in the vicinity of one or both of the legs. The magnetically interacting materials of the primary spectacle frame and the auxiliary spectacle frame may cooperate to secure the spectacle frames together (e.g., so as to prevent the auxiliary spectacle frame from moving downward and/or upward relative to the primary spectacle frame). In addition, a magnetic field blocking member may be disposed adjacent at least a top or a bottom of at least one of the magnetically interacting materials (e.g., to aid in proper placement of the auxiliary spectacle frame relative to the primary spectacle frame).

26 Claims, 5 Drawing Sheets

EYEGLASSES WITH MAGNETIC MOUNTING INCLUDING A MAGNETIC FIELD BLOCKING MEMBER

FIELD OF THE INVENTION

The present invention relates to eyeglasses with magnetic mounting.

One embodiment of the present invention relates to magnetically mounting auxiliary eyeglasses to primary eyeglasses.

More particularly, in one embodiment of the present invention an eyeglass device may include a primary spectacle frame and an auxiliary spectacle frame (each of which frames may support respective lenses). The primary spectacle frame may include two legs pivotally coupled to two side extensions. Further, the auxiliary spectacle frame may include two arms for engagement with the primary spectacle frame. In addition, each of the primary spectacle frame and the auxiliary spectacle frame may include one or more magnetically interacting materials (e.g., one or more magnets and/or one or more ferrous metals). The one or more magnetically interacting materials of the primary spectacle frame may be disposed in the vicinity of a bridge of the primary spectacle frame and/or in the vicinity of one or both of the side extensions. Likewise, the one or more magnetically interacting materials of the auxiliary spectacle frame may be disposed in the vicinity of a bridge of the auxiliary spectacle frame and/or in the vicinity of one or both of the legs. The magnetically interacting materials of the primary spectacle frame and the auxiliary spectacle frame may cooperate to secure the spectacle frames together (e.g., so as to prevent the auxiliary spectacle frame from moving downward and/or upward relative to the primary spectacle frame). In addition, a magnetic field blocking member may be disposed adjacent at least a top or a bottom of at least one of the magnetically interacting materials (e.g., to aid in proper placement of the auxiliary spectacle frame relative to the primary spectacle frame).

For the purposes of the description and claims of the present invention the term "ferromagnetic material" is intended to refer to a material having a large and positive susceptibility to an external magnetic field (e.g., a ferrous metal). In this context, the term ferromagnetic material is intended to include a material which is magnetically attracted to a magnet.

Further, for the purposes of the description and claims of the present invention the term "magnetic material" is intended to refer to a material acting as a source of magnetic flux lines, such as a magnet (e.g., a permanent magnet). Of note, the terms ferromagnetic material and magnetic material are not necessarily mutually exclusive (e.g., a ferrous metal may become a magnet when a magnetic field is applied thereto).

Further still, for the purposes of the description and claims of the present invention the term "magnetically interacting material" is intended to refer to a ferromagnetic material or a magnetic material.

Further still, for the purposes of the description and claims of the present invention the term "magnetic field blocking member" is intended to refer to a material that comprises a metal, which metal results in at least partially reducing (but not necessarily entirely eliminating) the effect of a magnetic field. In other words, such a magnetic field blocking member will serve to at least reduce (but not necessarily entirely eliminate) a magnetic attraction between, for example, two magnets or between a magnet and a ferrous material.

BACKGROUND OF THE INVENTION

U.S. Pat. No. 4,070,103 to Meeker relates to a spectacle frame with attachable one-piece slide-on rim. More particularly, U.S. Pat. No. 4,070,103 indicates that the spectacle combination allows the wearer of eye glasses to change a single pair of glasses to match any individual fashion or mood. The basic spectacle unit is a combination of two lens, two lens rims, two temple members and a nose bridge. To complete the combination there are a number of attachable pairs of one-piece lens rim covers of various colors, designs, shapes and materials. The easily slid on lens rim covers are securely held in position by a lip, friction tape, magnetic strips or a snap-on type of friction fitting arrangement.

U.S. Pat. No. 5,416,537 to Sadler relates to magnetic means for securing auxiliary lenses to eyeglasses. More particularly, U.S. Pat. No. 5,416,537 indicates that an eyeglass device is provided which includes frames adapted for fitting on and being supported by a human wearer's head. Primary lenses are set within the frames and have an external shape. The eyeglass device also has auxiliary lenses which have an external shape which generally corresponds to the external shape of the primary lenses. First magnetic members are attached to the frames, and second magnetic members are attached to the auxiliary lenses in positions which correspond to the positions of the first magnetic members in the frames. The second magnetic members are arranged for engagement with the first magnetic members to thereby secure the auxiliary lenses to the eyeglasses.

U.S. Pat. No. 5,696,571 to Spencer et al. relates to clip-on type sunglasses with bridge mounting. More particularly, U.S. Pat. No. 5,696,571 indicates that clip-on type sunglasses include a mounting arrangement in which the bridge portion of the sunglass frame is adapted to fit behind the bridge of the eyeglasses on which the sunglasses are mounted, forming part of the mounting arrangement which also includes a pair of mounting clips, one located at the bottom of each eyewire, at the middle thereof, which receive the lower edges of the frame of the eyeglasses on which the sunglasses are mounted.

A series of patents, U.S. Pat. Nos. 6,343,858, 6,550,913 and 6,705,722 to Zelman relate to auxiliary eyewear attachment methods and apparatus. More particularly, these patents indicate that a method and apparatus for mounting auxiliary eyeglasses on conventional eyeglasses in which magnets are attached to appendages on the auxiliary eyeglasses mating with magnets mounted on the temple extensions of conventional eyeglasses are provided. The magnets on the auxiliary eyeglasses are mounted in sockets formed on the appendages of the auxiliary eyeglasses such that their maximum magnetic force is oriented vertically or parallel to the plane of the conventional eyeglass frame. The appendages on the auxiliary eyeglass frame fit beneath the temple extensions on the conventional eyeglasses frame to hold the auxiliary frames in place.

Of note, none of the above-mentioned patents provide for a magnetic field blocking member (e.g., to aid in proper placement of an auxiliary spectacle frame relative to a primary spectacle frame).

SUMMARY OF INVENTION

In one embodiment of the present invention an eyeglass device may include a primary spectacle frame and an auxiliary spectacle frame (each of which frames may support respective lenses). The primary spectacle frame may include two legs pivotally coupled to two side extensions.

Further, the auxiliary spectacle frame may include two arms for engagement with the primary spectacle frame. In addition, each of the primary spectacle frame and the auxiliary spectacle frame may include one or more magnetically interacting materials (e.g., one or more magnets and/or one or more ferrous metals). The one or more magnetically interacting materials of the primary spectacle frame may be disposed in the vicinity of a bridge of the primary spectacle frame and/or in the vicinity of one or both of the side extensions. Likewise, the one or more magnetically interacting materials of the auxiliary spectacle frame may be disposed in the vicinity of a bridge of the auxiliary spectacle frame and/or in the vicinity of one or both of the legs. The magnetically interacting materials of the primary spectacle frame and the auxiliary spectacle frame may cooperate to secure the spectacle frames together (e.g., so as to prevent the auxiliary spectacle frame from moving downward and/or upward relative to the primary spectacle frame). In addition, a magnetic field blocking member may be disposed adjacent at least a top or a bottom of at least one of the magnetically interacting materials (e.g., to aid in proper placement of the auxiliary spectacle frame relative to the primary spectacle frame).

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Referring now to the drawings, and initially to FIGS. 1 to 4, an eyeglass device in accordance with one embodiment of the present invention may comprise a primary spectacle frame 10 for supporting primary lenses therein (in one example (which example is intended to be illustrative and not restrictive), the primary spectacle frame 10 may support therein two lenses). The primary spectacle frame 10 may include two side portions (e.g., a left side and a right side), each having an extension 11 extended therefrom (e.g., extended rearward and/or sideways therefrom) for pivotally coupling leg 12 thereto. The primary spectacle frame 10 may further include two projections 13 (e.g., secured to the rear and/or side portions thereof) for supporting two respective magnetically interacting materials 14 (in one example (which example is intended to be illustrative and not restrictive), each of such magnetically interacting materials 14 may comprise a magnet and/or a ferrous metal).

Figure 1:
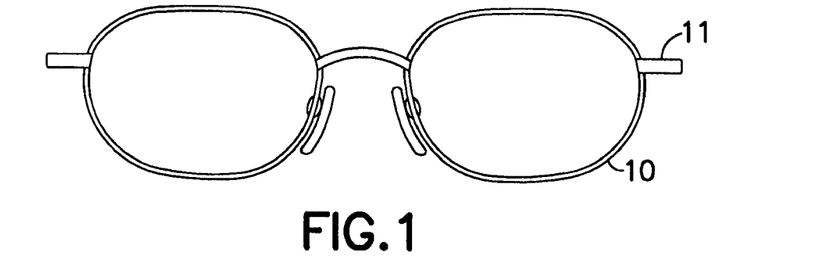
FIG. 1 is a front view of a primary spectacle frame (including therein two lenses) according to an embodiment of the present invention.
Figure 2:
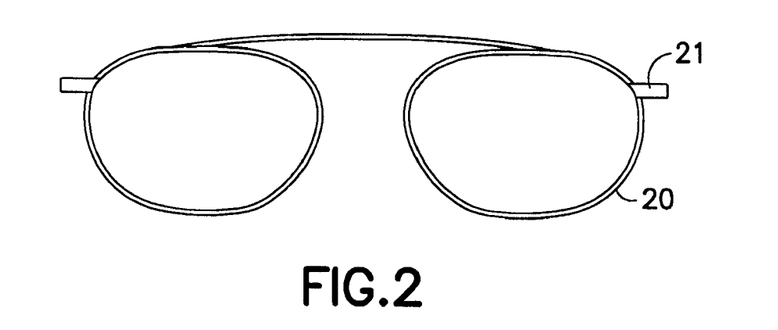
FIG. 2 is a front view of an auxiliary spectacle frame (including therein two lenses) according to an embodiment of the present invention.
Figure 3:
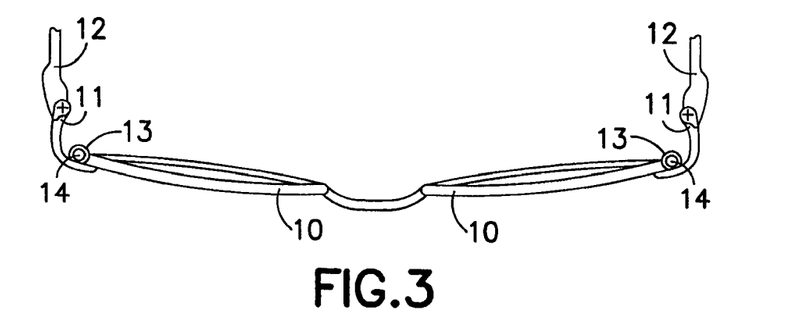
FIG. 3 is a top view of the primary spectacle frame of FIG. 1.
Figure 4:
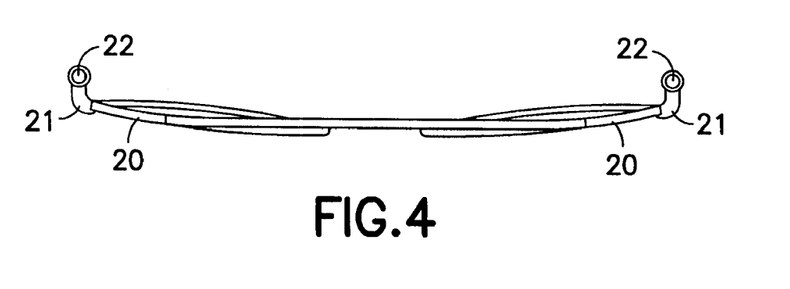
FIG. 4 is a top view of the auxiliary spectacle frame of FIG. 2.
Figure 5:
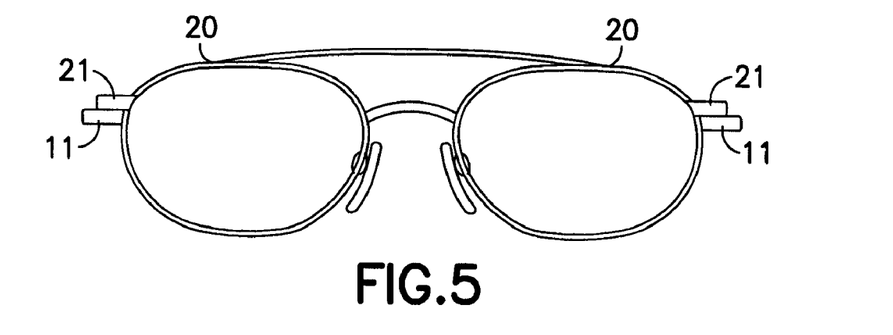
FIG. 5 is a front view of a primary spectacle frame and auxiliary spectacle frame combination (showing the primary spectacle frame of FIG. 1 and the auxiliary spectacle frame of FIG. 2)
Figure 6:
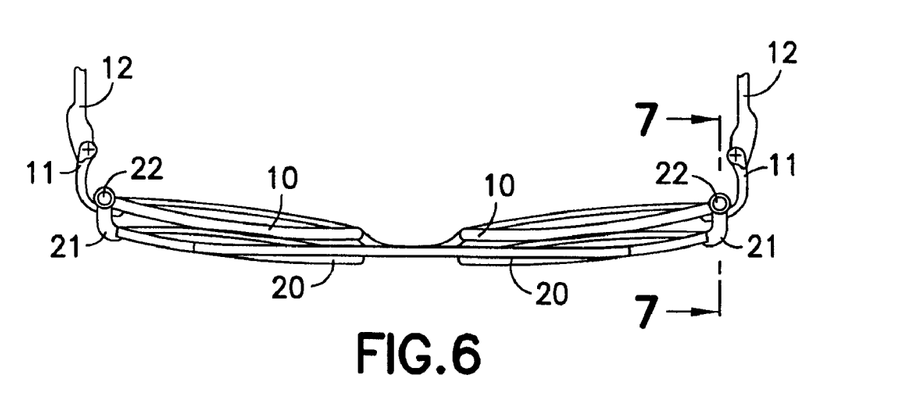
FIG. 6 is a top view of the primary spectacle frame and auxiliary spectacle frame combination of FIG. 5.

An auxiliary spectacle frame 20 may be provided for supporting auxiliary lenses therein (in one example (which example is intended to be illustrative and not restrictive), the auxiliary spectacle frame 20 may support therein two lenses). The auxiliary spectacle frame 20 may further include two side portions (e.g., a left side and a right side), each having an arm 21 extended therefrom (e.g., extended rearward and/or sideways therefrom) for extending over and for engaging with the primary spectacle frame 10 (see, e.g., FIGS. 5 and 6). The auxiliary spectacle frame 20 may also include two magnetically interacting materials 22 (in one example (which example is intended to be illustrative and not restrictive), each of such magnetically interacting materials may comprise a magnet and/or a ferrous metal). The magnetically interacting materials 22 may be secured to arms 21 and may engage the magnetically interacting materials 14 of the primary spectacle frame 10 such that the auxiliary spectacle frame 20 may be stably held relative to primary spectacle frame 10. In one example (which example is intended to be illustrative and not restrictive), magnetically interacting materials 22 may engage magnetically interacting materials 14 from above (in this configuration auxiliary spectacle frame 20 may be supported on primary spectacle frame 10—see, e.g., FIGS. 5, 6 and 7). In another example (which example is intended to be illustrative and not restrictive), magnetically interacting materials 22 may engage magnetically interacting materials 14 from below (that is, arms 21 may be disposed below extensions 11).

Of note, a magnetic field blocking member (the makeup of which is described in more detail below) may be disposed adjacent at least one of magnetically interacting materials 14, 22. More particularly, when the invention is configured such that magnetically interacting material 22 is to engage magnetically interacting material 14 from above, a magnetic field blocking member may be disposed below magnetically interacting material 14 and/or above magnetically interacting material 22. Conversely, when the invention is configured such that magnetically interacting material 22 is to engage magnetically interacting material 14 from below, a magnetic field blocking member may be disposed above magnetically interacting material 14 and/or below magnetically interacting material 22.

Use of such a magnetic field blocking member may serve to eliminate or at least reduce misalignment of auxiliary spectacle frame 20 with primary spectacle frame 10. That is, when the invention is configured such that magnetically interacting material 22 is designed to engage magnetically interacting material 14 from above, a magnetic field blocking member disposed below magnetically interacting material 14 and/or above magnetically interacting material 22 will serve to reduce the magnetic attraction between magnetically interacting material 14 and magnetically interacting material 22 when magnetically interacting material 22 is inadvertently moved below magnetically interacting material 14 during the primary spectacle frame/auxiliary spectacle frame engagement process.

Likewise, when the invention is configured such that magnetically interacting material 22 is designed to engage magnetically interacting material 14 from below, a magnetic field blocking member disposed above magnetically interacting material 14 and/or below magnetically interacting material 22 will serve to reduce the magnetic attraction between magnetically interacting material 14 and magnetically interacting material 22 when magnetically interacting material 22 is inadvertently moved above magnetically interacting material 14 during the primary spectacle frame/auxiliary spectacle frame engagement process.

This use of a magnetic field blocking member may serve to cure a major deficiency of the prior art (in particular, as disclosed by the above-mentioned Zelman '858, '913 and '722 series of patents) by helping to ensure that the auxiliary spectacle frame is properly attached to the primary spectacle frame (e.g., that an auxiliary spectacle frame intended to be attached below a primary spectacle frame is not inadvertently attached above the primary spectacle frame and/or that an auxiliary spectacle frame intended to be attached above a primary spectacle frame is not inadvertently attached below the primary spectacle frame).

Referring now to FIGS. 8A–D and 9A–D, various examples of placement of one or more magnetic field blocking members relative to magnetically interacting materials 14, 22 are shown.

Figure 8A:
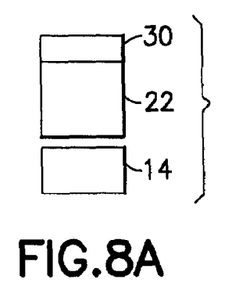
FIGS. 8A–D and 9A–D show various examples of placement of one or more magnetic field blocking members.
Figure 8B:
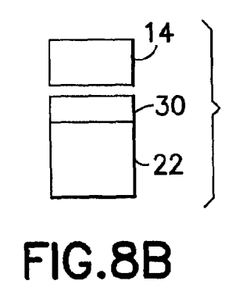

In the example shown in FIGS. 8A and 8B (which example is intended to be illustrative and not restrictive), magnetic field blocking member 30 may be disposed on a top surface of magnetically interacting material 22. In this configuration magnetically interacting material 22 is free to engage magnetically interacting material 14 from above via a strong magnetic attraction (see FIG. 8A) but magnetically interacting material 22 is not free to engage magnetically interacting material 14 via a strong magnetic attraction from below because of the intervening magnetic field blocking member 30 (see FIG. 8B). Thus, this configuration may aid in proper placement of an auxiliary spectacle frame from above a primary spectacle frame.

Figure 8C:
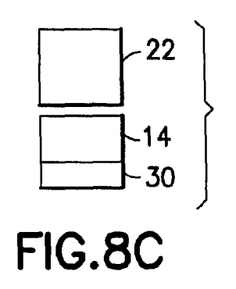
Figure 8D:
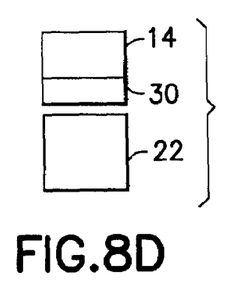

In the example shown in FIGS. 8C and 8D (which example is intended to be illustrative and not restrictive), magnetic field blocking member 30 may be disposed on a bottom surface of magnetically interacting material 14. In this configuration magnetically interacting material 22 is free to engage magnetically interacting material 14 from above via a strong magnetic attraction (see FIG. 8C) but magnetically interacting material 22 is not free to engage magnetically interacting material 14 via a strong magnetic attraction from below because of the intervening magnetic field blocking member 30 (see FIG. 8D). Thus, this configuration may aid in proper placement of an auxiliary spectacle frame from above a primary spectacle frame.

Figure 9A:
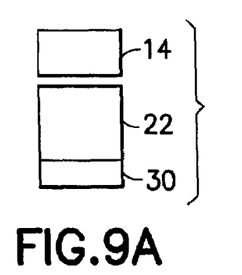
Figure 9B:
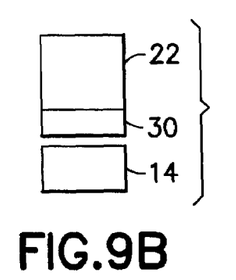

In the example shown in FIGS. 9A and 9B (which example is intended to be illustrative and not restrictive), magnetic field blocking member 30 may be disposed on a bottom surface of magnetically interacting material 22. In this configuration magnetically interacting material 22 is free to engage magnetically interacting material 14 from below via a strong magnetic attraction (see FIG. 9A) but magnetically interacting material 22 is not free to engage magnetically interacting material 14 via a strong magnetic attraction from above because of the intervening magnetic field blocking member 30 (see FIG. 9B). Thus, this configuration may aid in proper placement of an auxiliary spectacle frame from below a primary spectacle frame.

Figure 9C:
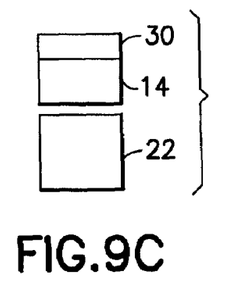
Figure 9D:
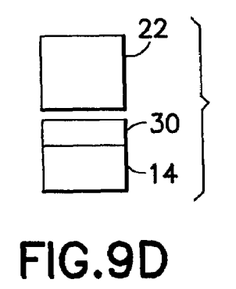
Figure 10:
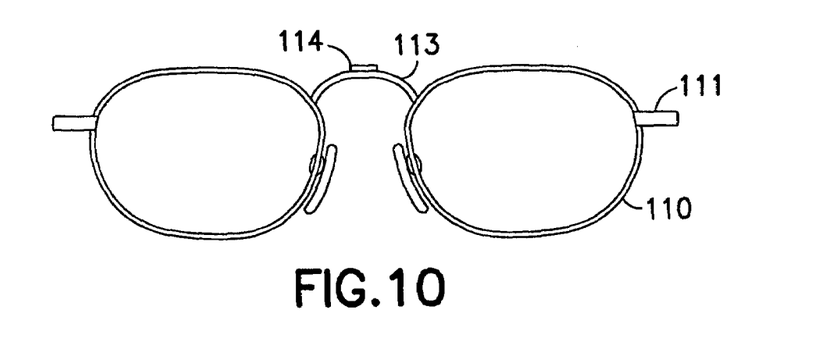
FIG. 10 is a front view of a primary spectacle frame (including therein two lenses) according to a another embodiment of the present invention.
Figure 11:
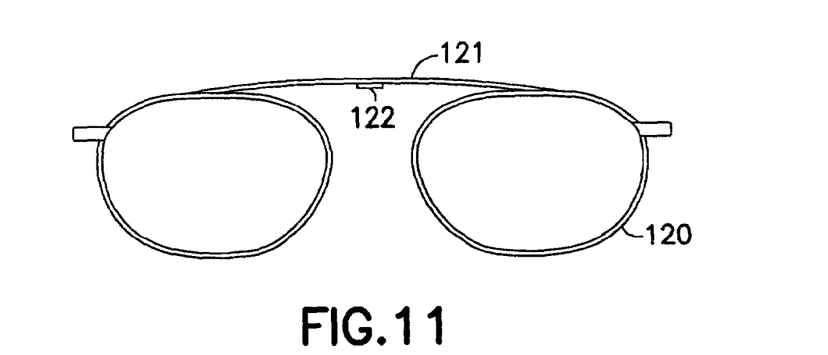
FIG. 11 is a front view of an auxiliary spectacle frame (including therein two lenses) according to another embodiment of the present invention.
Figure 12:
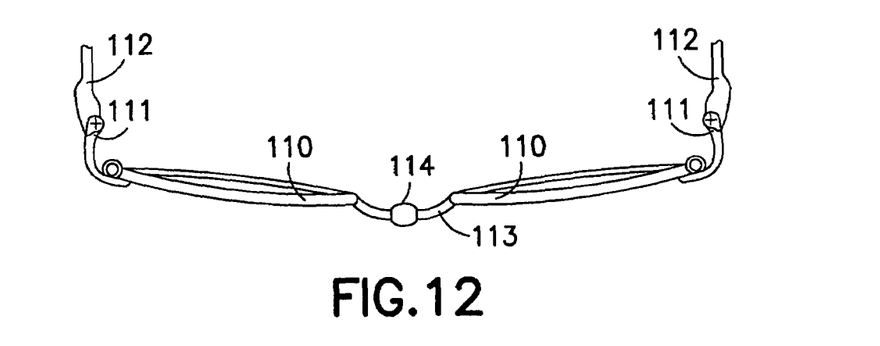
FIG. 12 is a top view of the primary spectacle frame of FIG. 10.
Figure 13:
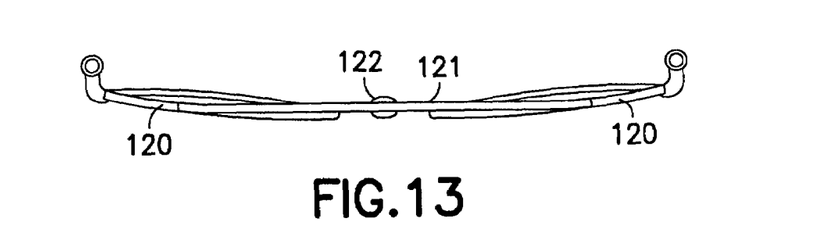
FIG. 13 is a top view of the auxiliary spectacle frame of FIG. 11.
Figure 14:
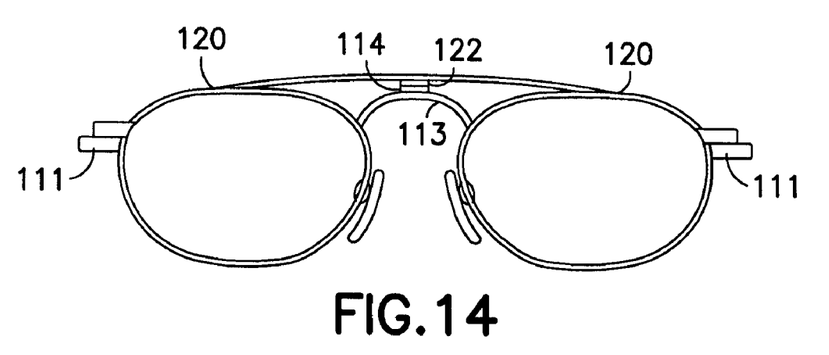
FIG. 14 is a front view of a primary spectacle frame and auxiliary spectacle frame combination (showing the primary spectacle frame of FIG. 10 and the auxiliary spectacle frame of FIG. 11)
Figure 15:
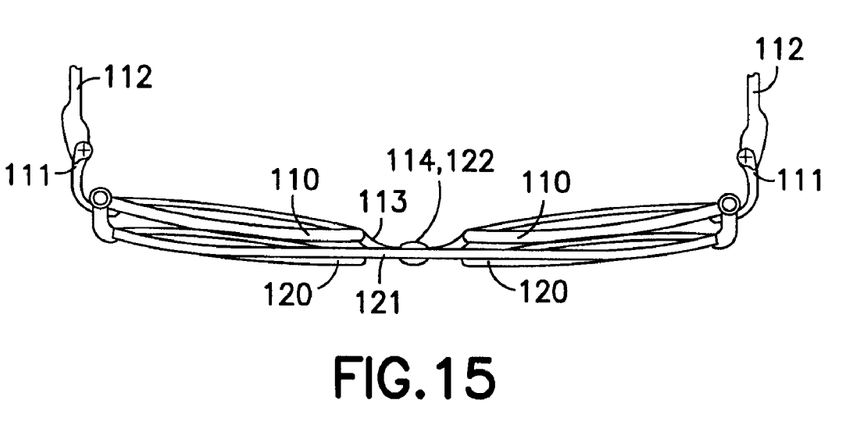
FIG. 15 is a top view of the primary spectacle frame and auxiliary spectacle frame combination of FIG. 14.

In the example shown in FIGS. 9C and 9D (which example is intended to be illustrative and not restrictive), magnetic field blocking member 30 may be disposed on a top surface of magnetically interacting material 14. In this configuration magnetically interacting material 22 is free to engage magnetically interacting material 14 from below via a strong magnetic attraction (see FIG. 9C) but magnetically interacting material 22 is not free to engage magnetically interacting material 14 via a strong magnetic attraction from above because of the intervening magnetic field blocking member 30 (see FIG. 9D). Thus, this configuration may aid in proper placement of an auxiliary spectacle frame from below a primary spectacle frame.

Of course, there may be a number of magnetic field blocking members 30 to correspond to each set of magnetically interacting materials 14, 22. Further, magnetic field blocking member 30 may be attached to magnetically interacting material 14, magnetic field blocking member 30 may be attached to magnetically interacting material 22 and/or magnetic field blocking member 30 may be attached to neither of magnetically interacting materials 14, 22 (e.g., magnetic field blocking member 30 may be attached to the primary spectacle frame or the auxiliary spectacle frame).

Referring now to the makeup of the magnetic field blocking member, it is noted (as well known to those of ordinary skill in the art) that blocking of a magnetic field (either essentially total elimination or reduction) can be accomplished by redirecting the magnetic flux lines from a magnetic source. To do this, a permeable material may be disposed adjacent the magnetic source (the permeable material provides a path of least magnetic reluctance so that the magnetic flux lines are fully or partially redirected away from a protected space).

In this regard, the magnetic field blocking member may comprise, for example (which example is intended to be illustrative and not restrictive), AD-MU (e.g., AD-MU-80, AD-MU-78, AD-MU-48, AD-MU-00). It is believed that AD-MU is the name of a line of alloy material marketed by AD-Vance Magnetics, of Rochester, Ind. Of course, any materials with similar properties marketed under any other name by any other entity may be used if desired.

In another example (which example is intended to be illustrative and not restrictive), the magnetic field blocking member may comprise a layered structure.

In another example (which example is intended to be illustrative and not restrictive), the magnetic field blocking member may comprise a homogeneous structure.

In another example (which example is intended to be illustrative and not restrictive), the magnetic field blocking member may comprise a non-homogeneous structure.

In another example (which example is intended to be illustrative and not restrictive), the magnetic field blocking member may comprise a foil.

In another example (which example is intended to be illustrative and not restrictive), the magnetic field blocking member may comprise a sprayed-on coating.

In another example (which example is intended to be illustrative and not restrictive), the magnetic field blocking member may comprise a flexible structure.

In another example (which example is intended to be illustrative and not restrictive), the magnetic field blocking member may comprise an inflexible structure.

In another example (which example is intended to be illustrative and not restrictive), the magnetic field blocking member may comprise an alloy.

In one specific example (which example is intended to be illustrative and not restrictive), the elements of the alloy may include, but not be limited to: (a) Ni; (b) Fe; (c); Mo; (d) S; (e) C; (f) Mn; (g) Si; (h) P; and (i) any combination thereof.

In another example (which example is intended to be illustrative and not restrictive), the magnetic field blocking member may consist of a single chemical element.

In another example (which example is intended to be illustrative and not restrictive), the magnetic field blocking member may comprise metal (e.g., metal filings, metal pieces, metal shavings) in a carrier (e.g., an epoxy).

Referring now once again to FIGS. 5–7, it is to be noted in connection with this example that the arms 21 may be engaged with and may be supported on the upper portion of the primary spectacle frame 10 such that the auxiliary spectacle frame 20 may be stably supported and secured to the primary spectacle frame 10. In this configuration the auxiliary spectacle frame 20 will not move downward relative to the primary spectacle frame and will not be easily disengaged from the primary spectacle frame when the user makes vigorous movements (e.g., conducts jogging or jumping exercises). Of course, as mentioned above, other configurations of the present invention include, but are not limited to, engagement of the primary spectacle frame by the auxiliary spectacle frame from below (in this configuration the auxiliary spectacle frame will not move upward relative to the primary spectacle frame and will not be easily disengaged from the primary spectacle frame when the user makes vigorous movements (e.g., conducts jogging or jumping exercises).

It is further to be noted in connection with the example of FIGS. 1–7 that the magnetically interacting materials 14 may be secured to projections 13 and the magnetically interacting materials 22 may be secured to the arms 21. Since, in this example, the magnetically interacting materials 14, 22 are not embedded directly in the frames 10, 20, the frames 10, 20 are not necessarily required to be formed with holding structures (e.g. cavities) therein. Thus, the strength of the frames 10, 20 will not be decreased. Of course, if desired, one or more of magnetically interacting materials 14, 22 may be embedded directly into frame 10 and/or frame 20 (e.g., in cavities or other holding structures).

Further, it is noted that each of magnetically interacting materials 14, 22 may be mounted flush with its surrounding surface, below its surrounding surface (that is, in a cavity or recess) or above its surrounding surface (that is, forming a protrusion or protuberance).

Referring now once again to FIGS. 3–7, it is noted that in one example (which example is intended to be illustrative and not restrictive) the engaging surfaces between magnetically interacting materials 14 in primary spectacle frame 10 and the magnetically interacting materials 22 in auxiliary spectacle frame 20 may lie in a plane that is substantially horizontal when the eyeglass device is worn. Of course, in other examples the engaging surfaces between magnetically interacting materials 14 in primary spectacle frame 10 and the magnetically interacting materials 22 in auxiliary spectacle frame 20 may lie in one or more other planes.

Referring now once again to FIG. 7, it is seen that in one example (which example is intended to be illustrative and not restrictive) the projections 13 and the magnetically interacting materials 14 may be located lower than the upper portion of the primary spectacle frame 10 and that the end portions of the arms 21 and/or the magnetically interacting materials 22 may be extended downward toward the projections 13 (such that the arms 21 and/or the magnetically interacting materials 22 may hook on the primary spectacle frame 10 and such that the auxiliary spectacle frame 20 may further be stably supported and secured to the primary spectacle frame 10).

Figure 7:
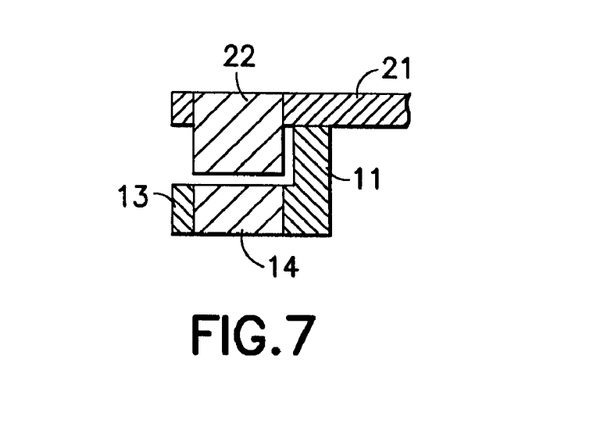
FIG. 7 is a cross sectional view taken along lines 7—7 of FIG. 6.

In this regard, it is noted that in one example (which example is intended to be illustrative and not restrictive) magnetically interacting materials 14,22 may not necessarily be in contact with each other. Rather, magnetically interacting materials 14, 22 may be magnetically engaged with, but not supported on, each other (see FIG. 7). Instead, the arm 21 securing the magnetically interacting material 22 may be supported on an upper side portion of the primary spectacle frame 10 (as shown in FIG. 7, the upper side portion can be an upper part of the side portion securing the projection 13). Of course, in other examples the magnetically interacting materials 14, 22 may contact one another.

Finally, it is noted that for the auxiliary spectacle frame to be magnetically attached to the primary spectacle frame at least one of the auxiliary spectacle frame and the primary spectacle frame should include a magnetically interacting material in the form of a magnetic material (e.g., in the form of a magnet).

Referring now to FIGS. 10–15, an eyeglass device in accordance with another embodiment of the present invention may comprise a primary spectacle frame 110 for supporting primary lenses therein (in one example (which example is intended to be illustrative and not restrictive), the primary spectacle frame 110 may support therein two lenses). The primary spectacle frame 110 may include two side portions (e.g., a left side and a right side), each having an extension 111 extended therefrom (e.g., extended rearward and/or sideways therefrom) for pivotally coupling leg 112 thereto. The primary spectacle frame 110 may further include bridge 113 for supporting magnetically interacting material 114 (in one example (which example is intended to be illustrative and not restrictive), such magnetically interacting material 114 may comprise a magnet and/or a ferrous metal).

An auxiliary spectacle frame 120 may be provided for supporting auxiliary lenses therein (in one example (which example is intended to be illustrative and not restrictive), the auxiliary spectacle frame 120 may support therein two lenses). The auxiliary spectacle frame 120 may further include bridge 121 supporting magnetically interacting material 122 (in one example (which example is intended to be illustrative and not restrictive), such magnetically interacting material may comprise a magnet and/or a ferrous metal). The magnetically interacting material 122 may engage the magnetically interacting material 114 of the primary spectacle frame 110 such that the auxiliary spectacle frame 120 may be stably held relative to primary spectacle frame 110. In one example (which example is intended to be illustrative and not restrictive), magnetically interacting material 122 may engage magnetically interacting material 114 from above (in this configuration auxiliary spectacle frame 120 may be supported on primary spectacle frame 110—see, e.g., FIGS. 14 and 15). In another example (which example is intended to be illustrative and not restrictive), magnetically interacting material 122 may engage magnetically interacting material 114 from below.

Of course, as described above, a magnetic field blocking member may be disposed adjacent at least one of magnetically interacting materials 114, 122. More particularly, when the invention is configured such that magnetically interacting material 122 is to engage magnetically interacting material 114 from above, a magnetic field blocking member may be disposed below magnetically interacting material 114 and/or above magnetically interacting material 122. Conversely, when the invention is configured such that magnetically interacting material 122 is to engage magnetically interacting material 114 from below, a magnetic field blocking member may be disposed above magnetically interacting material 114 and/or below magnetically interacting material 122.

While a number of embodiments of the present invention have been described, it is understood that these embodiments are illustrative only, and not restrictive, and that many modifications may become apparent to those of ordinary skill in the art. For example, the auxiliary spectacle frame may include one or more lens(es) which are tinted (e.g., to make sunglasses when the auxiliary spectacle frame is attached to the primary spectacle frame). Further, the auxiliary spectacle frame may include one or more prescription lens(es) (e.g., to change a prescription of the lens(es) of the primary spectacle frame when the auxiliary spectacle frame is attached thereto). Further still, all or part of one or more of the magnetically interacting material(s) and/or the magnetic field blocking member(s) may be covered or coated for cosmetic purposes (e.g., covered or coated to match a color and/or texture of the primary spectacle frame and/or the auxiliary spectacle frame). Further still, each of the primary spectacle frame and the auxiliary spectacle frame may comprise plastic and/or metal. Further still, any steps may be carried out in any desired order.

What is claimed is:

1. An eyeglass device, comprising:
   a primary spectacle frame for supporting two lenses therein, wherein the primary spectacle frame includes a left side and a right side;
   a first magnet disposed on the left side of the primary spectacle frame and a second magnet disposed on the right side of the primary spectacle frame;
   an auxiliary spectacle frame for supporting two lenses therein, wherein the auxiliary spectacle frame includes a left side and a right side;
   a first magnetically interacting material disposed on the left side of the auxiliary spectacle frame and a second magnetically interacting material disposed on the right side of the auxiliary spectacle frame; and
   at least one magnetic field blocking member, wherein the magnetic field blocking member comprises a metal, which metal results in at least partially reducing the effect of a magnetic field;
   wherein the auxiliary spectacle frame is held to the primary spectacle frame at least in part by magnetic attraction between the top of each magnet and the bottom of each magnetically interacting material; and
   wherein the magnetic field blocking member is disposed between the two sets of magnets and magnetically interacting materials when the magnetically interacting materials are below the magnets.

2. The eyeglass device of claim 1, comprising two magnetic field blocking members, each of which magnetic field blocking members is associated with a respective set of magnets and magnetically interacting materials.

3. The eyeglass device of claim 1, wherein each of the left and right sides of the primary spectacle frame includes an extension extending therefrom, wherein each of the left and right sides of the auxiliary spectacle frame includes an arm extending therefrom, wherein the first magnet is disposed on one of the extensions and the second magnet is disposed on the other one of the extensions; and wherein the first magnetically interacting material is disposed on one of the arms and the second magnetically interacting material is disposed on the other one of the arms.

4. The eyeglass device of claim 3, wherein magnetic attraction between each set of magnets and magnetically interacting materials when the arms of the auxiliary spectacle frame are below the extensions of the primary spectacle frame is reduced by the magnetic field blocking member to an extent sufficient such that the auxiliary spectacle frame is not held to the primary spectacle frame by magnetic attraction.

5. The eyeglass device of claim 1, wherein each magnetically interacting material is a ferrous metal.

6. The eyeglass device of claim 1, wherein each magnetically interacting material is magnet.

7. An eyeglass device, comprising:
   a primary spectacle frame for supporting two lenses therein, wherein the primary spectacle frame includes a left side and a right side;
   a first magnet disposed on the left side of the primary spectacle frame and a second magnet disposed on the right side of the primary spectacle frame;
   an auxiliary spectacle frame for supporting two lenses therein, wherein the auxiliary spectacle frame includes a left side and a right side;
   a first magnetically interacting material disposed on the left side of the auxiliary spectacle frame and a second magnetically interacting material disposed on the right side of the auxiliary spectacle frame; and
   at least one magnetic field blocking member, wherein the magnetic field blocking member comprises a metal, which metal results in at least partially reducing the effect of a magnetic field;
   wherein the auxiliary spectacle frame is held to the primary spectacle frame at least in part by magnetic attraction between the bottom of each magnet and the top of each magnetically interacting material; and
   wherein the magnetic field blocking member is disposed between the two sets of magnets and magnetically interacting materials when the magnetically interacting materials are above the magnets.

8. The eyeglass device of claim 7, comprising two magnetic field blocking members, each of which magnetic field blocking members is associated with a respective set of magnets and magnetically interacting materials.

9. The eyeglass device of claim 7, wherein each of the left and right sides of the primary spectacle frame includes an extension extending therefrom, wherein each of the left and right sides of the auxiliary spectacle frame includes an arm extending therefrom, wherein the first magnet is disposed on one of the extensions and the second magnet is disposed on the other one of the extensions; and wherein the first magnetically interacting material is disposed on one of the arms and the second magnetically interacting material is disposed on the other one of the arms.

10. The eyeglass device of claim 9, wherein magnetic attraction between each set of magnets and magnetically interacting materials when the arms of the auxiliary spectacle frame are above the extensions of the primary spectacle frame is reduced by the magnetic field blocking member to an extent sufficient such that the auxiliary spectacle frame is not held to the primary spectacle frame by magnetic attraction.

11. The eyeglass device of claim 7, wherein each magnetically interacting material is a ferrous metal.

12. The eyeglass device of claim 7, wherein each magnetically interacting material is magnet.

13. An eyeglass device, comprising:
a primary spectacle frame for supporting two lenses therein, wherein the primary spectacle frame includes a bridge;
a magnet disposed on the bridge of the primary spectacle frame;
an auxiliary spectacle frame for supporting two lenses therein, wherein the auxiliary spectacle frame includes a bridge;
a magnetically interacting material disposed on the bridge of the auxiliary spectacle frame; and
at least one magnetic field blocking member, wherein the magnetic field blocking member comprises a metal, which metal results in at least partially reducing the effect of a magnetic field;
wherein the auxiliary spectacle frame is held to the primary spectacle frame at least in part by magnetic attraction between the top of the magnet and the bottom of the magnetically interacting material; and
wherein the magnetic field blocking member is disposed between the magnet and the magnetically interacting material when the magnetically interacting material is below the magnet.

14. The eyeglass device of claim 13, wherein magnetic attraction between the magnet and the magnetically interacting material when the magnetically interacting material is below the magnet is reduced by the magnetic field blocking member to an extent sufficient such that the auxiliary spectacle frame is not held to the primary spectacle frame by magnetic attraction.

15. The eyeglass device of claim 13, wherein the magnetically interacting material is a ferrous metal.

16. The eyeglass device of claim 13, wherein the magnetically interacting material is magnet.

17. An eyeglass device, comprising:
a primary spectacle frame for supporting two lenses therein, wherein the primary spectacle frame includes a bridge;
a magnet disposed on the bridge of the primary spectacle frame;
an auxiliary spectacle frame for supporting two lenses therein, wherein the auxiliary spectacle frame includes a bridge;
a magnetically interacting material disposed on the bridge of the auxiliary spectacle frame; and
at least one magnetic field blocking member, wherein the magnetic field blocking member comprises a metal, which metal results in at least partially reducing the effect of a magnetic field;
wherein the auxiliary spectacle frame is held to the primary spectacle frame at least in part by magnetic attraction between the bottom of the magnet and the top of the magnetically interacting material; and
wherein the magnetic field blocking member is disposed between the magnet and the magnetically interacting material when the magnetically interacting material is above the magnet.

18. The eyeglass device of claim 17, wherein magnetic attraction between the magnet and the magnetically interacting material when the magnetically interacting material is above the magnet is reduced by the magnetic field blocking member to an extent sufficient such that the auxiliary spectacle frame is not held to the primary spectacle frame by magnetic attraction.

19. The eyeglass device of claim 17, wherein the magnetically interacting material is a ferrous metal.

20. The eyeglass device of claim 17, wherein the magnetically interacting material is magnet.

21. An eyeglass device, comprising:
a primary spectacle frame for supporting at least one lens therein,
at least one magnetically interacting material disposed on the primary spectacle frame;
an auxiliary spectacle frame for supporting at least one lens therein,
at least one magnetically interacting material disposed on the auxiliary spectacle frame; and
at least one magnetic field blocking member disposed adjacent at least one of the magnetically interacting material disposed on the primary spectacle frame and the magnetically interacting material disposed on the auxiliary spectacle frame, wherein the magnetic field blocking member comprises a metal, which metal results in at least partially reducing the effect of a magnetic field;
wherein at least one of the magnetically interacting material disposed on the primary spectacle frame and the magnetically interacting material disposed on the auxiliary spectacle frame is a magnet; and
wherein the auxiliary spectacle frame is held to the primary spectacle frame at least in part via a first magnetic attraction between the magnetically interacting material disposed on the primary spectacle frame and the magnetically interacting material disposed on the auxiliary spectacle frame when the magnetically interacting material disposed on the auxiliary spectacle frame is placed adjacent the magnetically interacting material disposed on the primary spectacle frame such that the magnetic field blocking member is not disposed between the two and wherein a second magnetic attraction, less than the first magnetic attraction, exists between the magnetically interacting material disposed on the primary spectacle frame and the magnetically interacting material disposed on the auxiliary spectacle frame when the magnetically interacting material disposed on the auxiliary spectacle frame is placed adjacent the magnetically interacting material disposed on the primary spectacle frame such that the magnetic field blocking member is disposed between the two.

22. The eyeglass device of claim 21, wherein the second magnetic attraction is insufficient to hold the auxiliary spectacle frame to the primary spectacle frame when the magnetically interacting material disposed on the auxiliary spectacle frame is placed adjacent the magnetically interacting material disposed on the primary spectacle frame such that the magnetic field blocking member is disposed between the two.

23. The eyeglass device of claim 21, wherein each of the magnetically interacting materials disposed on the primary and auxiliary spectacle frames is selected from the group including: (a) a ferrous metal; and (b) a magnet.

24. The eyeglass device of claim 21, further comprising magnetically interacting material disposed at each of a left side and a right side of the primary spectacle frame and magnetically interacting material disposed at each of a left side and a right side of the auxiliary spectacle frame.

25. The eyeglass device of claim 21, further comprising magnetically interacting material disposed at a bridge of the primary spectacle frame and magnetically interacting material disposed at a bridge of the auxiliary spectacle frame.

26. The eyeglass device of claim 21, wherein the primary spectacle frame supports two lenses therein and the auxiliary spectacle frame supports two lenses therein.

* * * * *